Patented Dec. 28, 1937

2,103,598

UNITED STATES PATENT OFFICE 2,103,598

METALLIZING COMPOSITION FOR GLASS

Rowland D. Smith, Corning, N. Y., assignor to Corning Glass Works, Corning, N. Y., a corporation of New York No Drawing. Original application February 11, 1935, Serial No. 6,066. Divided and this application November 21, 1935, Serial No. 50,960

4 Claims. (Cl. 106—36.2)

This invention, which is a continuation in part of my pending application Sr. No. 636,571, filed October 6, 1932, and a division of my pending application Sr. No. 6066, filed February 11, 1935, relates to metal coatings on glass and has for its object to metallize glass and make hermetically soldered seals therewith.

In soldering glass hermetically to metal, it is necessary first to prepare a metal coating which is permanently incorporated with the surface of the glass and which will readily be wet by the solder. Prior methods of metallizing glass do not produce a coating which is satisfactory for my purpose. Metal lusters and burnish pastes have long been used for producing fired-on decorative coatings on ordinary glass, but such metallized coatings are not readily wet by solder and are not sufficiently well bonded to the glass. Lusters and burnish pastes comprise easily reducible metals, such as platinum, gold or silver, or salts thereof mixed with a small amount of lead borate flux and a vehicle such as lavender oil. When coatings, that are formed by firing lusters or burnish pastes on to glass, are subsequently plated with copper they may more readily be soldered, but such seals are not uniformly and infallibly hermetic.

I have discovered an improved composition for metallizing glass, which contains an easily reducible metal and a flux containing lead fluoride, barium fluoride or barium borate, or mixtures thereof. Easily reducible metals, as the term is used herein, comprise the noble metals platinum, gold, and silver. Silver is particularly suitable for my purpose. By means of my special flux I am able to metallize glass with silver or other easily reducible metal at moderate temperatures with an increased degree of adherence between glass and metal and an improvement of chemical stability over that obtained with the prior lead borate flux.

In my aforesaid pending application I have shown that when lead fluoride is added to a silvering composition, which contains lead borate flux and the same is applied to glass and fired on in the usual manner, the bond between glass and metal is mechanically stronger and chemically more stable than that obtained through the use of prior metallizing compositions. Although lead borate and lead fluoride each have a fusing point somewhat in excess of 800° C., I have found that a mixture of the two has a fusing point which is lower than that of either one alone and when the two materials are mixed in the proper proportions the product forms an eutectic mixture, that is, a mixture of minimum melting point. Since the lead fluoride is not only very corrosive to crucibles of all sorts but tends to decompose when heated with lead borate, thereby losing some of the fluorine, it is difficult to determine the exact melting point of any particular mixture. However, as nearly as can be determined, the eutectic corresponds approximately to a mixture of equal parts by weight of lead borate, $Pb(BO_2)_2$, and lead fluoride $PbF_2$, and the melting point of the eutectic mixture is in the neighborhood of 300° C.

I have further investigated the effect of various other metallic fluorides on the properties of metallizing compositions and on the strength of bond thus to be obtained between glass and metal. I have now found that barium fluoride, when used as the flux in a metallizing composition, combined with lead borate or barium borate, will produce as good or better results than lead fluoride. I have further found that barium borate, when used alone, or in combination with lead borate as the flux, is suitable for my purpose and will produce a better result than prior compositions containing lead borate flux.

In practicing my invention I first prepare a metallizing composition in accordance with my discoveries. For small jobs or in case the amount of metallizing to be done is relatively small, I may have recourse to a commercial metallizing composition which I modify in accordance with my invention. Various metallizing compositions are available commercially, in the form of pastes and liquids, which usually contain an easily reducible metal or salt thereof together with a flux such as lead borate, thallium borate, bismuth subnitrate or the like and a suitable vehicle such as lavender oil. One of these which I have found suitable for my purpose consists approximately of 65% powdered silver, 3.5% lead borate, 1.5% bismuth subnitrate and 30% organic vehicle. To such a commercial metallizing composition I add preferably about 10% of lead fluoride or barium fluoride or barium borate. This has the effect of increasing the mechanical strength and stability of the glass to metal bond when such composition is applied to glass and fired in. Although I prefer the proportion named above, I do not wish to be limited thereby, since the use of smaller or larger amounts of my new fluxes will produce at least some of the benefits of my invention.

For metallizing on a large scale I find it economical and preferable to prepare a metallizing composition as follows: For example, about 12 parts by weight of silver carbonate are mixed with one part by weight of my flux and sufficient lavender oil or other suitable organic vehicle is added to form a paste. The flux in this case may consist of equal parts of lead borate and lead fluoride, or barium borate and lead fluoride, or lead borate and barium fluoride, or barium borate and barium fluoride, or barium borate alone. In lieu of silver carbonate, I may use the oxide or the finely powdered metal and instead of silver I may use other easily reducible metals, but I prefer to use silver carbonate. Other proportions of metal to flux may be used, but for my purpose I prefer the above mentioned 12 to 1 ratio.

I have found that low expansion borosilicate glasses will form a better bond with the metallized coating than ordinary glasses. As an example of glasses that are particularly suitable for my purpose, I refer to the glass $B_1$ of the Sullivan and Taylor Patent No. 1,304,623.

The metallizing composition is applied to the glass, preferably by means of a brush. The coated glass article is then heated to about 620° C. at a rate not fast enough to crack the glass or cause bubbling of the liquid vehicle, which will rapidly evaporate. After heating at 620° C., for about one-half hour or more, the article is cooled at a proper rate to anneal it and the metal coating is found to be so firmly attached to the surface thereof that it cannot be removed mechanically without rupturing or tearing the glass.

The metallized surface may then be electroplated with copper. The electro-deposition of copper is accomplished in the usual manner as, for example, by making the metallized surface the cathode in a plating bath comprising water and about six ounces by weight of 98% sulphuric acid and about 32 ounces of commercial copper sulphate per gallon of water. A current density of about 15 amperes per square foot is applied for a sufficient length of time to form a thin coating of copper over the silver. Glass which has thus been metallized and copper plated may be soldered to with the same ease and facility of solid copper and any flux may be used which is suitable for use with this metal.

I claim:

1. A metallizing composition which contains an easily reducible metal and a flux comprising substantially equal parts of a borate and a fluoride of a metal of the group consisting of lead and barium.

2. A metallizing composition which contains silver and substantially equal parts of lead borate and lead fluoride.

3. A metallizing composition which contains silver and substantially equal parts of lead borate and barium fluoride.

4. A metallizing composition which contains silver and substantially equal parts of lead fluoride and barium borate.

ROWLAND D. SMITH.